(12) United States Patent
Heikkonen et al.

(10) Patent No.: US 8,022,953 B2
(45) Date of Patent: Sep. 20, 2011

(54) DIMENSIONS AND COMPUTER AIDED MODELING

(75) Inventors: Teemu Heikkonen, Helsinki (FI); Natalia Kaijalainen, Espoo (FI); Janne Nisula, Läyliäinen (FI); Tiina Rautakorpi, Espoo (FI)

(73) Assignee: Tekla Corporation, Espoo (FI)

( * ) Notice: Subject to any disclaimer, the term of this patent is extended or adjusted under 35 U.S.C. 154(b) by 904 days.

(21) Appl. No.: 12/022,206

(22) Filed: Jan. 30, 2008

(65) Prior Publication Data
US 2009/0189887 A1 Jul. 30, 2009

(51) Int. Cl.
*G06T 11/20* (2006.01)
(52) U.S. Cl. ........................................................ 345/440
(58) Field of Classification Search ................... 345/440
See application file for complete search history.

(56) References Cited

U.S. PATENT DOCUMENTS

| | | | | |
|---|---|---|---|---|
| 4,539,653 A * | 9/1985 | Bartlett et al. | ............... | 715/235 |
| 4,912,657 A * | 3/1990 | Saxton et al. | ............... | 715/853 |
| 5,251,130 A * | 10/1993 | Andrews et al. | ................. | 704/3 |
| 5,548,706 A * | 8/1996 | Koizumi et al. | ............. | 715/255 |
| 6,232,985 B1 * | 5/2001 | Chase et al. | ................. | 345/441 |
| 6,629,097 B1 * | 9/2003 | Keith | .................................... | 1/1 |
| 6,992,685 B2 * | 1/2006 | Hallbauer et al. | ............. | 345/619 |
| 7,184,046 B1 * | 2/2007 | Hawkins | ....................... | 345/468 |
| 2002/0158886 A1 * | 10/2002 | Hallbauer et al. | ............ | 345/619 |
| 2004/0267695 A1 * | 12/2004 | Alho et al. | ......................... | 707/1 |
| 2006/0031776 A1 * | 2/2006 | Glein et al. | .................... | 715/779 |
| 2006/0136398 A1 * | 6/2006 | Suomi et al. | ....................... | 707/3 |
| 2007/0273558 A1 * | 11/2007 | Smith et al. | ................ | 340/995.1 |
| 2009/0187486 A1 * | 7/2009 | Lefenfeld et al. | ................ | 705/14 |

FOREIGN PATENT DOCUMENTS

| | | |
|---|---|---|
| JP | 5165902 A | 7/1993 |
| JP | 11053407 A | 2/1999 |
| WO | WO 98/53429 | 11/1998 |

OTHER PUBLICATIONS

The Arabic Language Script, Kamel al-baba, Rouh Al-Khatt published in Lebanon, 1996, http://www.indiana.edu/~arabic/arabic_script.htm.*
Orhan Toker: "Dimension style settings 4: If the dimension doesn't fit?" [Online] Dec. 4, 2006, Taliasoft, DAILYAUTOCAD.COM, XP002500005.
VA Dept of Transportation, "General Drafting Procedures, vol. 5, Part 2, Dimensioning General", [Online], Feb. 1, 2005, XP002500006.
European Search Report dated Oct. 16, 2008 corresponding to EP 08 15 0602.
Japanese Office Action, dated Nov. 10, 2010, in Application No. 2008-020396.

* cited by examiner

*Primary Examiner* — Javid Amini
(74) *Attorney, Agent, or Firm* — Young & Thompson

(57) ABSTRACT

An object to be dimensioned may have such a small dimension that the dimension text will not fit within a space defined by extension lines. A dimensioning method is provided that exaggerates extension lines (24) of small dimensions so that the dimension text will fit within the space the dimension line has between the extensions lines although the dimension itself is not changed.

16 Claims, 4 Drawing Sheets

DIMENSIONS AND COMPUTER AIDED MODELING

FIELD

The invention relates to computer-aided modeling and particularly to dimension texts and associated lines in drawings.

BACKGROUND

Modeling means that a model is created from an object under design for describing the object to be manufactured. The development of data processing systems and computers has transformed modeling into a computerized process, where also drawings are produced from the model. Typically dimensioning is performed by drawing extensions lines from base points (points that are being measured), a dimension line is drawn between the extension lines at a certain distance from the object that is dimensioned, and a dimension text is added parallel with the dimension line, either above the dimension line or on the dimension line by breaking the dimension line. However, sometimes a dimension is so small that the dimension text does not fit within the space between the extension lines.

SUMMARY

The invention relates to a method, a program product and an apparatus which are characterized by what is stated in the independent claims. The preferred embodiments are disclosed in the dependent claims.

The invention is based on exaggerating at least one of extension lines of a small dimension so that there will be more space for a dimension text although the dimension itself is not changed. The term "dimension text" refers herein to any string containing one or more numbers and/or one or more symbols and/or one or more letters. A dimension text is typically a measure (dimensional number, index number).

BRIEF DESCRIPTION OF THE DRAWINGS

In the following different embodiments of the invention will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment.

The present invention is applicable to any computer-aided modeling system which can produce dimensioned drawings or views.

In the following, the invention will be described by using an exemplary system where a program according to an embodiment is run in a personal computer by utilizing a run-time database comprising information to be stored and already stored in a disc memory of the computer, without restricting the invention thereto. In another embodiment, an object-oriented database or a relation database, for example, can be utilized and used over a network from one or more terminals, for instance. Various programming techniques, storage of data in memory and manners of implementing databases develop constantly. This may require extra changes in the invention. Consequently, all terms and expressions should be interpreted broadly, and they are intended to describe, not to restrict, the invention.

Figure 1:
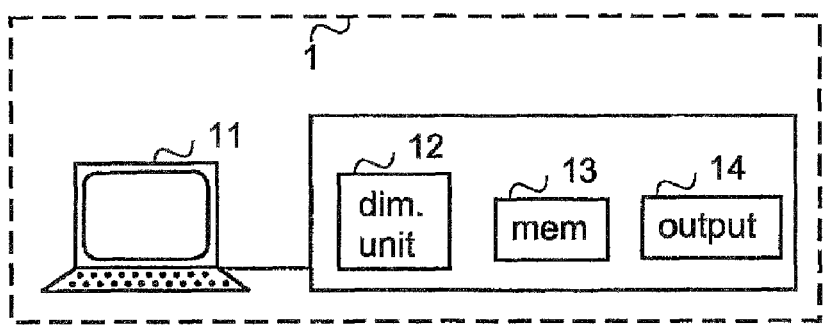
FIG. 1 is a simplified block diagram illustrating the architecture of a system used as an example.

FIG. 1 illustrates a simplified modeling system describing only some logical units with their operative connections, the implementation of which may deviate from what is presented. It is obvious to a person skilled in the art that the system may also comprise other functions and structures that need not be described in greater detail here. The more detailed structure of the system is irrelevant to the actual invention.

The modeling system 1 illustrated in FIG. 1 comprises a personal computer with a user interface 11, a dimensioning unit 12 according to an embodiment, memory 13 and output means 14.

The user interface 11 is the interface of the user, i.e. the person processing the model, to the modeling system. The user can create a model, modify a model, study it, print desired drawings and reports of it, view the drawings beforehand, input information to the model, etc. However, details of the user interface are irrelevant to the invention, and therefore they are not described in detail here.

The memory 13 comprises, for example, program snippets defined as part of a program, which constitute "program libraries", and data stored/to be stored during modeling, such as information relating to exaggeration of extension lines. In the exemplary system, data are stored in the memory in a file, for instance, and during processing the data constitute a "run-time database" in the central memory where they are read from a disk memory and where they can be processed faster. When the processing ends, the run-time data of the database, or at least the modified data, are stored in the disk memory. For example, drawings may be first created on the basis of a model and stored in the form of a drawing file in the memory by the means of the "run-time database". It is obvious to a person skilled in the art that data can be stored in one or more files and/or they can be stored/processed in another form and/or by using other memories.

Output means 14 are configured to output drawings to a printer. However, details of the manner of outputting data, such as a drawing, are irrelevant to the invention, and therefore they are not described in detail here.

Although the personal computer depicting an apparatus according to an embodiment has been depicted as one unity, different units and modules and memory may be implemented in one or more physical or logical units. Different embodiments of such an apparatus, or more precisely, different examples of a functionality of the dimensioning unit 12 are described in more detail below.

It should be appreciated that the apparatus may comprise other units or modules used in or for modeling. However, they are irrelevant to the actual invention and, therefore, they need not be discussed in more detail here.

Apparatuses, such as personal computers and/or other corresponding devices or apparatuses implementing the functionality of a corresponding apparatus described with an embodiment, comprise not only prior art means, but also means for exaggerating extension lines, for example. More precisely, they comprise means for implementing functionality of a corresponding apparatus described with an embodiment and they may comprise separate means for each separate function, or means may be configured to perform two or more functions. The apparatus may be configured as a computer or a micro-processor, such as single-chip computer element, including at least a memory for providing storage area used for arithmetic operation and an operation processor for executing the arithmetic operation. Present apparatuses comprise processors and memory that can be utilized in an embodiment. The memory may be removable memory detachably connected to the apparatus. For example, the dimensioning unit 12 may be a software application, or a module, or a unit configured as an arithmetic operation, or as a program (including an added or updated software routine), executed by an operation processor, such as a central processing unit. An embodiment provides a computer program embodied on any user-terminal-readable distribution/data storage medium, comprising program instructions which, when loaded into an apparatus, constitute the dimensioning unit 12. Programs, also called program products, including software routines, applets and macros, can be stored in any medium, and may be downloaded into an apparatus. In other words, all modifications and configurations required for implementing functionality of an embodiment may be implemented as added or updated software routines, application circuits (ASIC) and/or programmable circuits.

The modeling system illustrated in FIG. 1 represents the simplest modeling system. In larger modeling systems, the user interface may be a terminal and the memory a database with which the terminal communicates via a server. The server performs functions of the dimensioning unit of the exemplary system, or at least some of them, allowing also the terminal to carry out functions of the dimensioning unit of the exemplary system. There may be one or several networks between the terminal and the server. They may comprise several terminals and servers with databases, which are preferably integrated, to be visible to the modeler as one database and one database server. Whether the functions of the system to be described in the following are performed in a terminal, in a database server or so that some of them are performed in a terminal and some in a database server, i.e. the location where the dimensioning is performed, is irrelevant to the invention.

Figure 2:
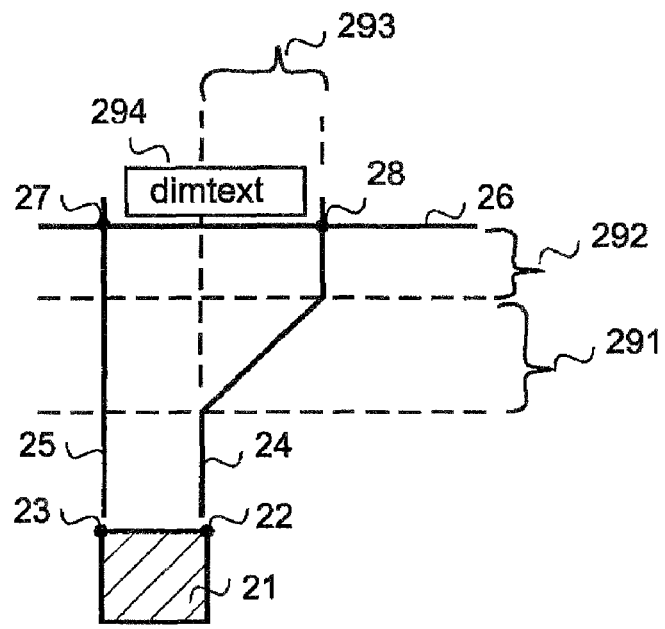
FIG. 2 is a block diagram illustrating some basic definitions.

FIG. 2 illustrates the basic principle of the invention by using a quadrat 21 as an example of an object to be dimensioned. When creating a drawing, the user may at the same time create the dimensions or some of the dimensions that are to be shown in the drawings or in an individual drawing by indicating base points 22, 23, for example. A base point 22, 23 describes a point that is measured, and a dimension describes a distance between two base points. When dimensioning, the dimensioning unit draws extension lines 24, 25 from the base points, the extension lines being perpendicular to a dimensioning direction. The dimension line 26 is drawn at a predetermined distance from the object to be dimensioned, and a point 27, 28, in which the extension line intersects the dimension line, is called a dimension point. In the example of FIG. 2, one of the extension lines, i.e. line 25, is exaggerated by an exaggeration amount 293 so that a dimension text (i.e. a space 294 the dimension text requires) fits within the space between dimension points. The exaggeration area is located between the object and the dimension line and has preferably a preset height 291 in a preset position 292. How the height, position and different distances are preset, bear no significance to the invention. In an embodiment, a user can set a value for the exaggeration amount 293 (amount value), a value for the preset height 291 (height value) and give the position 292 (position value). In other embodiments, the user can set one of the values or two of the values, and the dimensioning unit calculates one or more of the values based on preset rules, for example depending on the scale of the drawing. In a further embodiment, the dimensioning unit calculates all the values. Depending on an implementation, the values may be set for each separate dimension, or they are common to an object to be dimensioned. An advantage of embodiments allowing user to set values is that the user can thus adjust the appearance of the drawings.

In order to decide whether or not a dimension text fits within the dimension points, a limit may be used. The limit defines a "border" so that dimensions shorter than the limit are considered dimensions the dimension texts of which would not fit within the space defined by the dimension. An actual size of a dimension or the size of the dimension when printed on paper or outputted on screen may be used to decide whether or not the dimension text will fit within the space. The limit may be given by the user, and it may be given dimension-specifically, object-specifically, or drawing-specifically, or a default value may be used. It is also possible that the dimensioning unit calculates for each dimension whether or not the corresponding text will fit within the dimension points, taking into account possible margins thereby ensuring that the dimension text will fit within the space the dimension line has between the extension lines. It is also possible that the user may select whether or not a calculated limit, or a limit given by the user, or otherwise preset limit is used.

Figure 3:
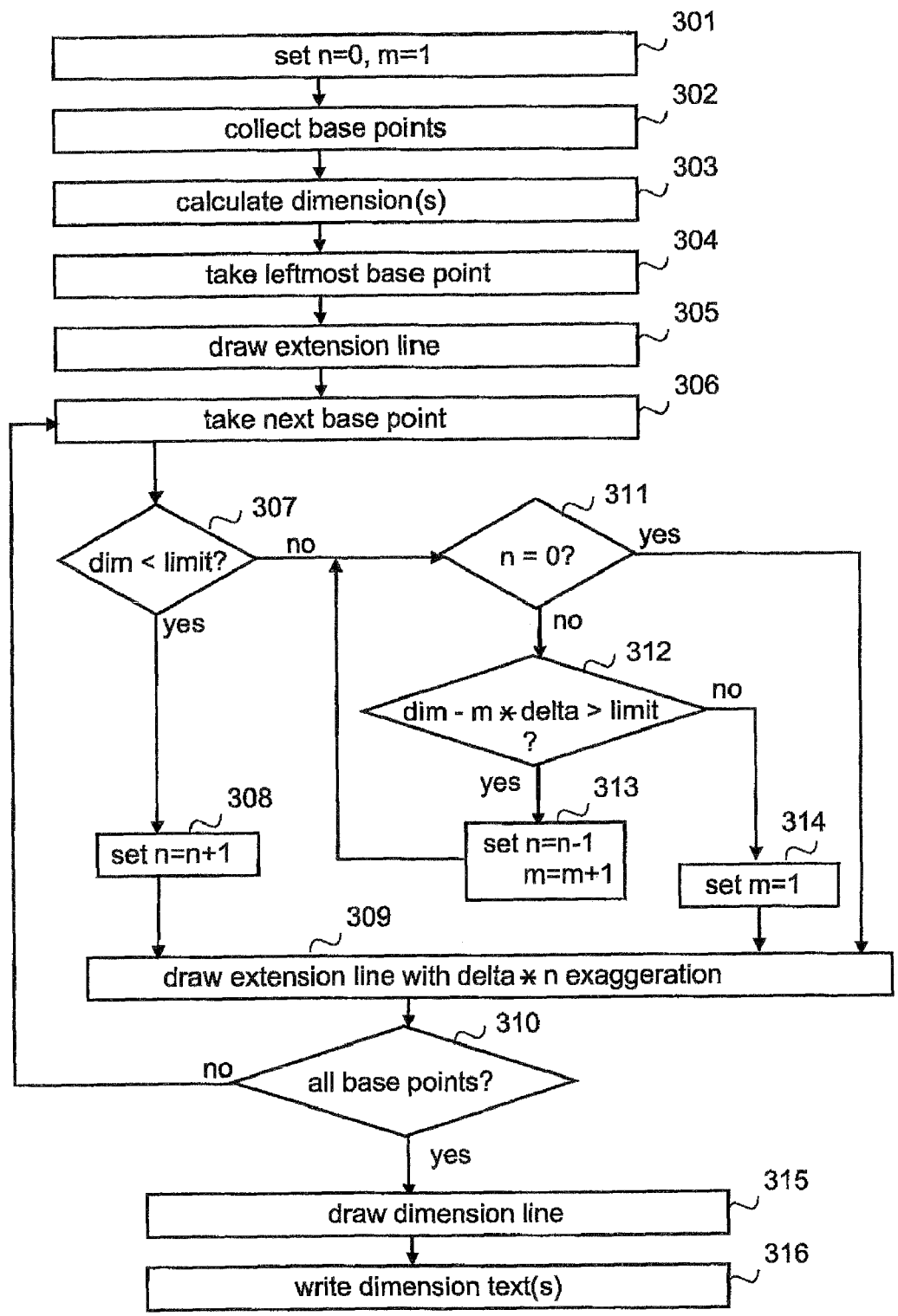
FIG. 3 is a flow chart illustrating a dimensioning process according to an embodiment.

FIG. 3 is a flow chart illustrating an embodiment in which the exaggeration is performed only in one direction, and in which a preset limit and a preset delta are used, the limit and delta being the same for all dimensions. The delta corresponds to the exaggeration amount illustrated in FIG. 2. Using the same delta for all dimensions provides visual consistency and a more presentable drawing and indicates well what is being dimensioned.

For the sake of clarity, FIG. 3 only shows the step in which the data are in the run-time database, For example, the storage of the dimensions in the memory of the computer and/or a retrieval of a model or part of a model with associated information from the memory, and/or setting the limit, delta, height value and position value, are not being separately shown.

The illustrated example starts when auxiliary variables n and m are initialized, in step 301, n to zero and m to 1. Then base points indicated by the user are collected, in step 302, and the corresponding dimension(s) is/are calculated, in step 303. Then the leftmost base point is taken, in step 304, and an extension line is drawn, in step 305, from the base point.

Then, the next base point is taken, in step 306, and the dimension calculated between the two adjacent base points is compared, in step 307, with the limit. If the dimension is smaller than the limit (step 307), the dimension text will not fit in within the dimension, and therefore the auxiliary variable n is updated, in step 308, to have a value n+1, and an extension line is drawn, in step 309, from the base point in question, in such a way that the extension line is exaggerated (in the exaggeration area) by an exaggeration a value of which is delta times n (delta*n).

Then it is checked, in point 310, whether or not all base points have been processed. If not, then the process continues from step 306 in which the next base point is taken.

If, in step 307, the dimension is not smaller than the limit, it is checked, in step 311, whether or not the value of n is zero. If the value is zero, there are no exaggerations to be taken into account, and the process continues in step 309, in which the extension line is drawn (by no exaggeration).

If the value is not zero (step 311), there is at least one exaggeration that needs to be taken into account. If the exaggeration is not taken into account, it may happen that the exaggeration causes that a dimension text does not fit within the space left from the dimension after the exaggeration. To avoid that, the other auxiliary factor m is used and it is checked, in step 311, whether or not the dimension subtracted by delta times m is bigger than the limit. If yes, the value of n is set, in step 313, to value n−1, and the value of m is updated, in step 313, to value m+1, and steps 311, 312 and 313 are repeated until the value of n is zero (step 311) or the dimension subtracted by delta times m is not bigger than the limit (step 312) any more. If the dimension is not so wide that it can "absorb" the previous exaggeration, i.e. a "no" is obtained as an answer in step 312, m is set to initial value 1 in step 314, and then the process continues from step 309, in which the extension line is drawn by exaggeration of delta times n.

When all base points have been processed (step 310), a dimension line is drawn, in step 315, and dimension texts are written, in step 316. Then the dimensions with corresponding lines may be stored to the run-time data-base, shown to the user and/or printed to drawings.

Figure 4:
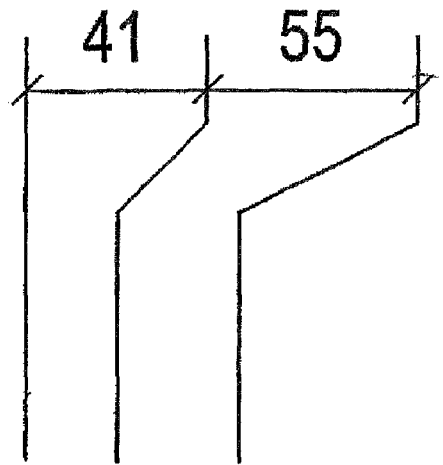
FIG. 4 illustrates an example of an outcome of the process illustrated in FIG. 3.

FIG. 4 shows one example of how dimensions made with the above embodiment may look like. In FIG. 4 it is assumed (although not shown) that the limit is 60, i.e. dimensions smaller than 60 are exaggerated.

Figure 5:
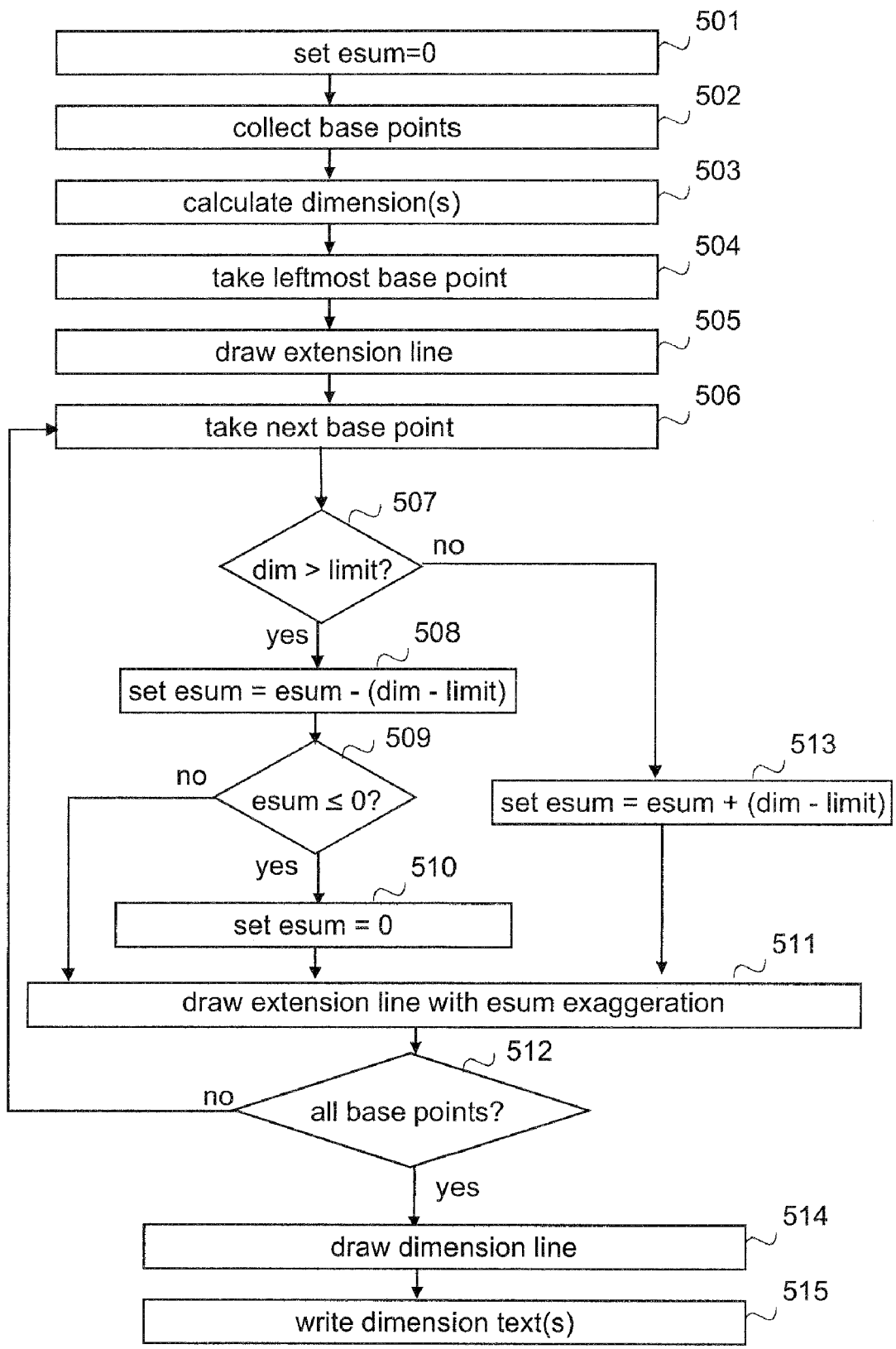
FIGS. 5 and 6 are flow charts illustrating dimensioning processes according to embodiments.

FIG. 5 is a flow chart illustrating an embodiment in which the exaggeration is performed only in one direction, and which utlizes a limit that is preset but an exaggeration amount, called esum, that varies, the limit being the same for all dimensions. An advantage of having a varying exaggeration amount is that it minimizes the total amount exaggerated and that the exaggeration size fits better with the dimension text.

Like FIG. 3, FIG. 5 also only shows the step in which the data are in the run-time database, the storage of the dimensions in the memory of the computer or a retrieval of a model, or part of a model with associated information from the memory, as well as setting the limit, height value and position value, are not being separately shown.

The illustrated example starts when the esum is initialized, in step 501, to zero. Then base points indicated by the user are collected, in step 502, and the corresponding dimension(s) is/are calculated, in step 503. Then the leftmost base point is taken, in step 504, and an extension line is drawn, in step 505, from the base point.

Then, the next base point is taken, in step 506, and the dimension calculated between the two adjacent base points is compared, in step 507, with the limit.

If the dimension is bigger than the limit, the limit is subtracted from the dimension and the outcome is subtracted from the esum, and the outcome is set as a new esum value in step 508. Then it is checked, in step 509, whether or not the esum is equal to or smaller than zero. If it is, the dimension is wide enough to "absorb" earlier exaggeration, if such exists, and the esum is set, in step 510, to zero and an extension line is drawn, in step 511, from the base point in question in such a way that the extension line is exaggerated by the esum (value). In this specific case, in which the esum is zero, no exaggeration takes place.

Then it is checked, in step 512, whether or not all base points have been processed. If not, then the process continues from step 506, in which the next base point is taken.

If the esum is more than zero (step 509), the process continues from step 511, in which the extension line is drawn by the esum exaggeration.

If the dimension is not bigger than the limit (step 507), the dimension will not fit within the space defined by dimension points, and the esum is updated, in step 513, by adding to it the outcome of the dimension subtracted from the limit. After that the process continues from step 511, in which the extension line is drawn by the esum exaggeration.

When all base points have been processed (step 512), a dimension line is drawn, in step 514, and dimension texts are written, in step 515. Then the dimensions with corresponding lines may be stored to the run-time data-base, shown to the user and/or printed to drawings.

In another embodiment of the invention, wider dimensions are not used to "absorb" previous exaggerations but after the first exaggeration, all the other extension lines are exaggerated. In other words, if the dimension is not smaller than the limit, the process described with FIG. 3 proceeds directly to step 309 to draw the extension line by the exaggeration, and steps 311-314 are left out, or in the process described with FIG. 5 steps 508-510 are left out.

Although in the above the dimensioning is started from the leftmost base point, it can be started as well from the rightmost base point. Yet further alternatives include a middle base point, or a base point given by the user, or a point between base points, in which cases the process may be configured to perform the exaggeration in both directions. In other words, the present invention does not limit the selection of the starting point and/or the direction of the exaggeration.

Figure 6:
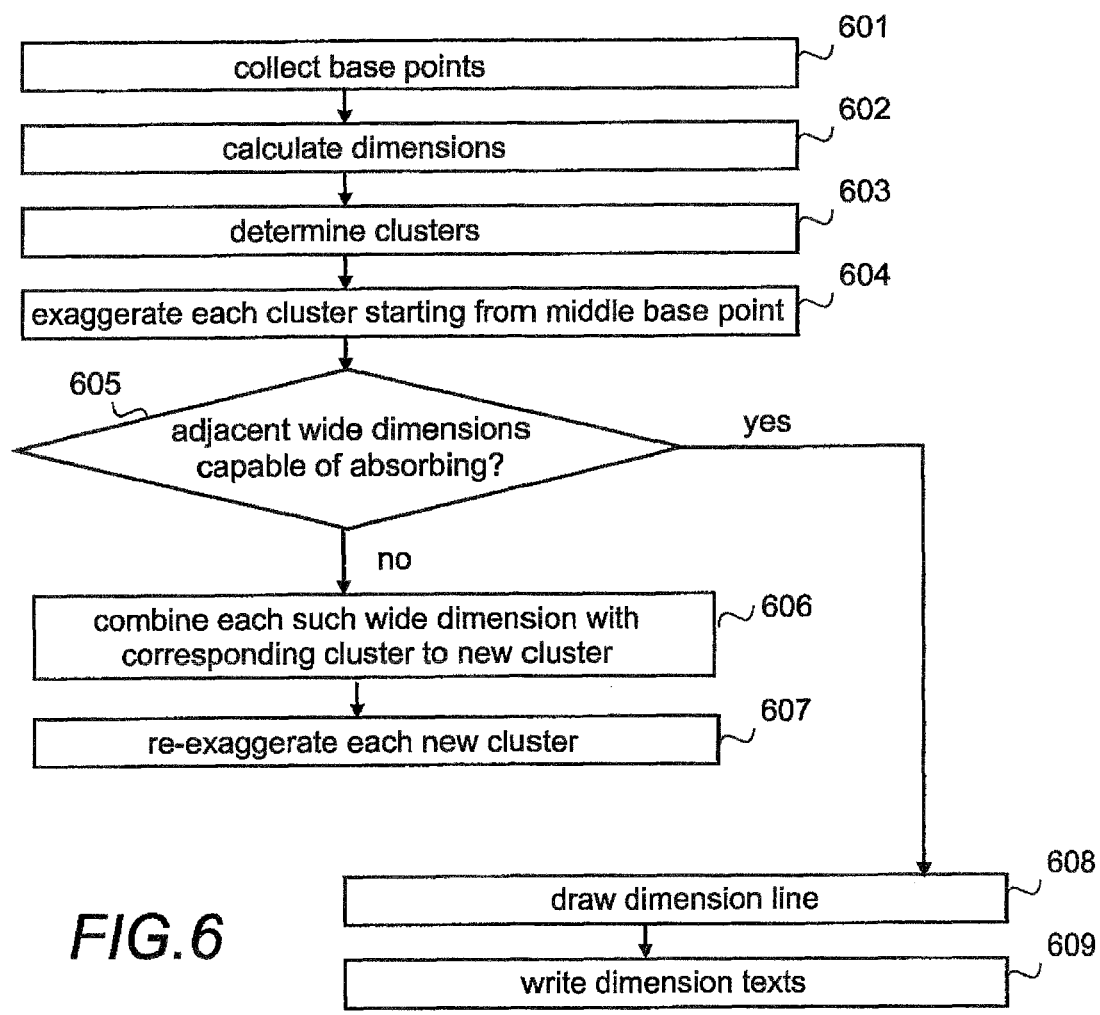
Figure 7:
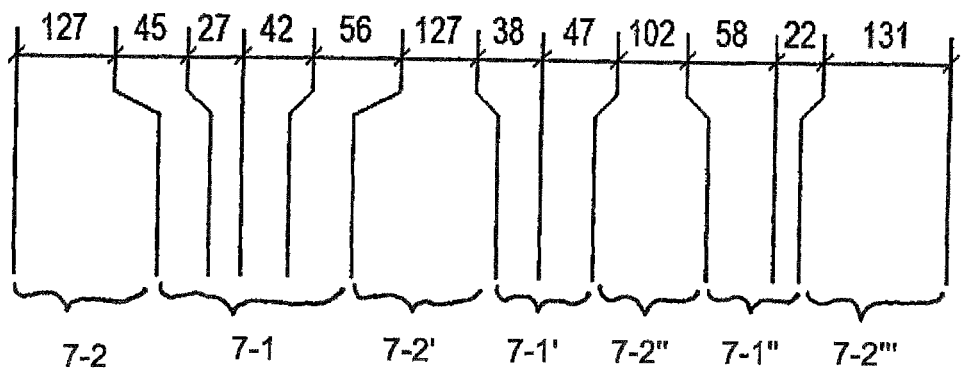
FIG. 7 illustrates an example of an outcome of the process illustrated in FIG. 6.

FIG. 6 illustrates dimensioning according to another embodiment of the invention, and FIG. 7 illustrates the outcome of the dimensioning illustrated in FIG. 6. For the sake of clarity, FIG. 6 also only shows the step in which the data are in the run-time database; the storage of the dimensions in the memory of the computer and/or a retrieval of a mode, or part of a model with associated information from the memory are not separately shown.

The illustrated example starts when base points indicated by the user are collected, in step 601, and the corresponding dimensions are calculated, in step 602. After that clusters are determined in step 603. Referring to FIG. 7, a cluster 7-1, 7-1', 7-1" is a dimension or a group of adjacent dimensions smaller than the limit and between two dimensions 7-2, 7-2', 7-2", 7-2''' that are wider than the limit, such dimensions being called below wide dimensions, or between a starting point/end point and a wide dimension. It should be appreciated that between two adjacent clusters there may be more than one wide dimension.

When clusters are determined, each cluster is exaggerated, in step 604, by starting the exaggeration from the middle base point of the cluster, if the cluster has an even number of dimensions, or from the middle of the middle dimension if the cluster has an odd number of dimensions, and performing the exaggeration in both directions. The exaggeration may be performed as described above with FIG. 3 or FIG. 5 (with the exception that the starting point differs and exaggeration is performed to both directions).

When all clusters have been exaggerated, it is checked, in step 605, whether or not the adjacent wide dimensions, not belonging to the cluster, are able to "absorb" the exaggeration of a cluster or the exaggerations of two clusters if the wide dimension is between two clusters.

If there is a wide dimension that cannot "absorb" the exaggeration, the wide dimension is combined, in step 606, with the corresponding cluster or clusters whose exaggeration the wide dimension is not capable to absorb. The extension lines in each new clusters thus formed are re-exaggerated, in step 607, by starting the exaggeration from the middle base point of the cluster if the cluster has an even number of dimensions, or from the middle of the middle dimension, if the cluster has an odd number of dimensions, and performing the exaggeration in both directions, as described above. After that the process continues from step 605, in which it is checked whether or not the adjacent wide dimensions are able to absorb the exaggeration.

When the adjacent wide dimensions can absorb the exaggeration (step 605), or there is only one cluster without any wide dimension, a dimension line is drawn, in step 608, and dimension texts are written, in step 609.

Then the dimensions with corresponding lines may be stored to the run-time database, shown to the user and/or printed to drawings.

In an embodiment it is not checked whether or not the wide dimension lines are capable of absorbing, i.e. steps 605, 606 and 607 are left out.

As stated above, FIG. 7 shows one example of how dimensions made with the embodiment may look like. As can be seen from FIG. 7, there are three clusters and four wide dimensions which were able to absorb the exaggeration of clusters. Although the example of FIG. 7 starts and ends with no exaggeration, that may not always be the case but also the starting and/or ending extension lines are exaggerated, if necessary. For example, if the dimensioned object would not have the leftmost wide dimension 7-2, the leftmost extension lines would have been exaggerated.

As can be understood from FIGS. 4 and 7, the embodiments provide a clear indication of what is being dimensioned; a useful feature especially if there is a small dimension in the end. Further, the embodiments provide a tool to obtain a continuous line for successive dimensions with readable dimension texts that do not overlap with each other The steps shown in FIGS. 3, 5 and 6 are not in an absolutely chronological order, and they may be executed in a different order than given here, or simultaneously. Other functions may be carried out between the described steps or simultaneously with them. It is also possible to leave out some of the steps shown in the Figures or to replace some of the described steps by a step that produces a corresponding end result. For example, a user may select individual dimensions and set them to be exaggerated dimensions. Another example includes that a dimension may have an "absorb limitation", such as a rule defining that it can absorb exaggerations of other dimensions by half or by two thirds of its length at the most.

It will be obvious to a person skilled in the art that, as the technology advances, the inventive concept can be implemented in various ways. The invention and its embodiments are not limited to the examples described above but may vary within the scope of the claims.

What is claimed is:

1. A method for dimensioning an object having at least two base points defining a dimension, the method being carried out by a computer-operated dimensioning unit and comprising:
   calculating a dimension between two base points,
   determining whether a corresponding dimension text will fit within a space defined by the two base points,
   if a corresponding dimension text will not fit within the space, determining plural clusters containing one or more adjacent dimensions, each of which having a dimension text that will not fit within the space, wherein adjacent said clusters have between them at least one dimension whose dimension text will fit with the space, and
   exaggerating the extension lines of the clusters so that a corresponding dimension text will fit within the space.

2. The method as claimed in claim 1, wherein the determining comprises comparing the dimension with a preset limit, and if the dimension is smaller than the limit, determining that the dimension text will not fit within the space.

3. The method as claimed in claim 2, wherein the exaggerating comprises exaggerating an extension line by an amount obtained by subtracting the dimension from the preset limit.

4. The method as claimed in claim 1, wherein the determining comprises calculating the space the dimension text requires and comparing the calculated space with the space defined by the two base point to decide whether or not the dimension text will fit within the space.

5. The method as claimed in claim 4, wherein the exaggerating comprises exaggerating an extension line by an amount required for the text to fit within the space.

6. The method as claimed in claim 1, wherein the exaggerating comprises exaggerating an extension line by a preset value.

7. The method as claimed in claim 1, further comprising:
   checking after the extension lines of the clusters have been exaggerated, whether the dimension or the dimensions between two adjacent clusters can absorb the exaggerations, and
   if not, combining the clusters and dimensions between them to a new cluster and exaggerating extension lines of the new cluster.

8. A non-transient computer readable storage medium having computer-executable instructions stored therein, wherein the execution of instructions in a computer causes the computer to:
   calculate a dimension between two base points,
   determine whether a corresponding dimension text will fit within the space defined by the two base points,
   if a corresponding dimension text will not fit within the space, determine plural clusters containing one or more adjacent dimensions, each of which having a dimension text that will not fit within the space, wherein adjacent said clusters have between them at least one dimension whose dimension text will fit with the space, and
   exaggerate extension lines of the clusters so that a corresponding dimension text will fit within the space.

9. The computer readable medium as claimed in claim 8, wherein the execution of instructions in a computer causes the computer further to compare the dimension with a preset limit, and if the dimension is smaller than the limit, to determine that the dimension text will not fit within the space.

10. The computer readable medium as claimed in claim 8, wherein the execution of instructions in a computer causes the computer to exaggerate an extension line by an amount obtained by subtracting the dimension from the preset limit.

11. The computer readable medium as claimed in claim 8, wherein the execution of instructions in a computer causes the computer further to calculate the space the dimension text requires and to compare the calculated space with the space defined by the two base point to decide whether or not the dimension text will fit within the space.

12. An apparatus comprising a dimensioning unit configured to:

calculate a dimension between two base points, determine whether a corresponding dimension text will fit within a space defined by the two base points, if a corresponding dimension text will not fit within the space, determine plural clusters containing one or more adjacent dimensions, each of which having a dimension text that will not fit within the space, wherein adjacent said clusters have between them at least one dimension whose dimension text will fit with the space, and exaggerate extension lines of the clusters in response to a corresponding dimension text not fitting within the space.

13. An apparatus as claimed in claim 12, wherein the dimensioning unit is further configured to compare the dimension with a preset limit, and to determine that the dimension text will not fit within the space if the dimension is smaller than the limit.

14. The apparatus as claimed in claim 12, wherein the dimensioning unit is further configured to calculate the space the dimension text requires and to compare the calculated space with the space defined by the two base points.

15. The apparatus as claimed in claim 12, wherein the dimensioning unit is further configured to calculate an amount by which the extension line is exaggerated.

16. The apparatus as claimed in claim 12, wherein the apparatus further comprises a user interface via which a user may set a value for at least one of the following parameters comprising a limit with which the dimension is compared, an amount by which the extension line is exaggerated, a height for an exaggeration area, the exaggeration area being defined by the height and the amount, and a position indicating the distance of the exaggeration area from a dimension line or from an object to be dimensioned.

* * * * *